(12) United States Patent
Fry et al.

(10) Patent No.: US 6,775,745 B1
(45) Date of Patent: Aug. 10, 2004

(54) METHOD AND APPARATUS FOR HYBRID DATA CACHING MECHANISM

(75) Inventors: Gregory P. Fry, Portland, OR (US); Carl P. Fry, Portland, OR (US)

(73) Assignee: Roxio, Inc., Santa Clara, CA (US)

( * ) Notice: Subject to any disclaimer, the term of this patent is extended or adjusted under 35 U.S.C. 154(b) by 295 days.

(21) Appl. No.: 09/949,300

(22) Filed: Sep. 7, 2001

(51) Int. Cl.[7] .............................................. G06F 12/00
(52) U.S. Cl. ........................ 711/134; 711/118; 711/158; 711/159
(58) Field of Search ................................ 711/134, 118, 711/158, 159

(56) References Cited

U.S. PATENT DOCUMENTS

| | | | | |
|---|---|---|---|---|
| 4,104,718 A | * | 8/1978 | Poublan et al. | 707/8 |
| 5,784,646 A | * | 7/1998 | Sawada | 710/38 |
| 5,802,563 A | * | 9/1998 | Hagersten et al. | 711/122 |
| 5,893,149 A | * | 4/1999 | Hagersten et al. | 711/135 |
| 5,893,150 A | * | 4/1999 | Hagersten et al. | 711/139 |
| 6,085,262 A | * | 7/2000 | Sawada | 710/38 |
| 6,378,042 B1 | * | 4/2002 | Henderson et al. | 711/128 |
| 6,546,473 B2 | * | 4/2003 | Cherkasova et al. | 711/158 |
| 2002/0078300 A1 | * | 6/2002 | Dharap | 711/133 |

OTHER PUBLICATIONS

Lee et al., "Implementation and Performance Evaluation of the LRFU Replacement Policy," pp 106–111, IEEE, 1997.*
Tanenbaum et al., "Operating Systems: Design and Implementation, Second Edition," pp 343–356, Prentice Hall, 1997.*
Lee et al., "On the Existence of a Spectrum of Policies that Subsumes the Least Recently Used (LRU) and Least Frequently Used (LFU) Policies," pp 134–143, ACM, May 1999.*

\* cited by examiner

Primary Examiner—Matthew Kim
Assistant Examiner—Stephen Elmore
(74) Attorney, Agent, or Firm—Martine & Penilla, LLP

(57) ABSTRACT

Methods and an apparatus for a caching mechanism which improves system performance are provided. One exemplary method includes reading files in response to a request from an operating system. Then, copies of the read files are stored in a cache where the cache is located within a random access memory of the computer. Next, frequency factors are assigned to each of the files stored in the cache, where the frequency factors indicate how often each of the corresponding files has been accessed by the operating system. Then, the frequency factors are scanned in response to a capacity of the cache being attained. Next, a least frequently and least recently used file is identified. Then, the least frequently and least recently used file is eliminated to liberate capacity of the cache.

17 Claims, 5 Drawing Sheets

METHOD AND APPARATUS FOR HYBRID DATA CACHING MECHANISM

BACKGROUND OF THE INVENTION

1. Field of the Invention

This invention relates generally to methods and apparatus for improving the performance of a computer and more particularly to providing a hybrid data caching mechanism for enhancing system performance.

2. Description of the Related Art

Users of the various versions of the WINDOWS™ operating systems, as well as any other available operating systems, often wait long periods of time for programs to load, system boot time and data to be read/written due to large amounts of disk input/output (I/O) used to service their request. Especially when running more than one software program simultaneously, disk I/O can take significant amounts of time while searching for and loading programs and data. Much of this wasted time or overhead is caused by disk seeks. Another reason for this wait time is the overhead in issuing commands to read/write the many small pieces of data.

Disk seeks occur for one of several reasons, but mainly because the data that makes up a file or program is placed in one area of the disk, while the directory information, the data that keeps track of where the files and programs are kept, is often kept in a totally different area. Thus, accessing a file requires accessing the data found in the directory and then accessing the file or program itself, causing the disk to seek to different locations. Multiple seeks are typically required to locate a file in the directory, especially if the file is not in the first part of the root directory. Some file-systems have a third area that must be referred to also, the file allocation table (FAT), which requires a third seek to access the file or program. Running more than one software program simultaneously can compound this problem due to the two programs keeping their data in different areas on the disk.

Small reads/writes occur because the file system driver that manages the files/data on the disk doesn't know what any given program will next request. Hence, the file system driver reads just the amount of data requested. When more than one program is requesting data, the file system driver can end up reading a small amount of data for a first program, then seek to a different area on the disk to read another small amount for a second program, then seek back to the original area to read the next small amount of data for the first program, and so forth. Also, because of use of a FAT file-system, the operating system (OS) may need to do additional small reads of the FAT in between the reads of the data to find where the data resides. In addition, the cache becomes fragmented from the small reads resulting in the lack of large areas in memory. This lack of large areas in memory makes it impossible to store large reads without discarding some of the smaller reads which may require further seeks further exacerbating the problem.

Another major reason contributing to both seeks and small reads/writes to the disk is the use of virtual memory. When more programs/data are loaded than can fit into the computers memory, the OS moves some of the programs/data onto an area of the hard disk known as the swap file or paging file. The amount moved is in "page" sized increments (with each page being 4 KB). Since there is no way that the OS knows ahead of time which piece of which program/data will be needed, it moves them on an as needed basis, which tends to cause many small reads/writes to different areas of the swap file.

To circumvent these problems, the file system drivers in the various versions of operating systems, such as WINDOWS™ and its variants, do a certain amount of caching. The operating systems tend to keep in memory (cache) the data that makes up the directory information. However, often the initial requests that cause the file system drivers to read and cache the directory information cause it to be read in small pieces interspersed with seeks to the files that the directory information represents. After this, accessing that same directory information is extremely fast for awhile. Eventually the file system drivers need the memory to cache some other directory information or program data, thus making way for a repeat of the initial situation when that directory is needed again. Furthermore, the caching programs strictly use the MRU-LRU (most recently used-least recently used) mechanism as their sole means of deciding what data to keep and what data to discard. Accordingly, an important file that has not been used recently will be discarded when the cache reaches a target capacity and is forced to free up additional capacity. Strictly adhering to the MRU-LRU mechanism fails to ensure that files which have been used often, but may not have been used recently, are maintained in the cache.

As a result, there is a need to solve the problems of the prior art to provide for an improved caching mechanism to minimize overhead and seeks, thereby improving system performance.

SUMMARY OF THE INVENTION

Broadly speaking, the present invention fills these needs by providing a method and apparatus that minimizes seeks and reads to a hard drive and which keeps data in the cache based upon currency of use and the number of times the data is used. It should be appreciated that the present invention can be implemented in numerous ways, including as a process, an apparatus, a system, or a device. Several inventive embodiments of the present invention are described below.

In one embodiment, a caching method for enhancing system performance of a computer is provided. The method initiates with reading files in response to a request from an operating system.. Then, copies of the read files are stored in a cache where the cache is located within a random access memory of the computer. Next, frequency factors are assigned to each of the files stored in the cache, where the frequency factors indicate how often each of the corresponding files is accessed by the operating system. Then, the frequency factors are scanned in response to a target capacity of the cache being attained. Next, a least frequently and least recently used file is identified. Then, the least frequently and least recently used file is eliminated to liberate capacity of the cache.

In another embodiment, a method for caching files in a cache of a random access memory (RAM) of a computer is provided. The method initiates with the files being requested. Here the files are stored on a storage medium. Next, the files are read and then the files are copied to the cache. Then, a frequency factor is assigned to each of the copied files, where the frequency factor reflects how often each of the copied files is accessed. Next, the frequency factor for each of the files is scanned in response to a target capacity of the cache becoming full. The scanning is configured to find a least frequently and least recently used file that has been least recently used. Then, the least frequently and least recently used file is discarded to free-up additional capacity of the cache.

In yet another embodiment, a computer readable media having program instructions for a caching method which enhances the system performance of a computer is provided. The computer readable media includes program instructions for storing files in a cache where the files are associated with a request from an operating system. The cache is located in a random access memory of the computer. The computer readable media includes program instructions for assigning frequency factors to each of the files stored in the cache, where the frequency factors indicate how often each of the corresponding files are requested by the operating system. Program instructions for scanning the frequency factors are included where the scanning is performed in response to a target capacity of the cache being attained. Also included are program instructions for identifying a least frequently and least recently used file. Program instructions for eliminating the least frequently and least recently used file in order to liberate capacity in the cache are included.

In still another embodiment, an apparatus for caching files in a computer system, where the computer system includes a microprocessor, a random access memory and an operating system is provided. The apparatus includes a disk drive for storing data, where the data includes a directory structure, file allocation table (FAT) and file data. The apparatus includes a cache located within a random access memory (RAM). The RAM is configured to cache files requested by the operating system according to a caching mechanism. The caching mechanism assigns frequency factors to each of the files in the cache. Upon reaching a target capacity of the RAM, the frequency factors for each of the files are scanned to identify a least frequently and least recently used file that is discarded to free cache capacity.

In another embodiment, a method for caching data in a computer is provided. The method initiates with files being stored in a cache where the files are associated with read operations and the cache is located in a RAM of the computer. Next, a frequency factor is associated with each of the files in the cache. The frequency factor of each of the files reflects how frequent each of the files is accessed. Then a least frequently and least recently used file is identified. The least frequently and least recently used file has a frequency factor lower than the frequency factor for other files in the cache. Next, the least frequently and least recently used file is eliminated from the cache when a target capacity of the cache is reached.

The advantages of the present invention are numerous. Most notably, system performance is enhanced through the hybrid caching mechanism where a file that has been used often but not recently is maintained in the cache. In addition, by performing large reads, the data will be present in the cache in order to minimize seeks and reads from the hard drive.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for a hybrid caching mechanism, combined with reading extended segments of data, that improves system performance. It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for improving performance of a computer by providing an improved caching mechanism implemented in conjunction with reading extended segments of data. The caching mechanism assigns a frequency factor to each the files in the cache in one embodiment. The frequency factor is updated to reflect how often a file is accessed in the cache in another embodiment. The frequency factor, in combination with the most recently used-least recently used (MRU-LRU) mechanism identify a least frequently used (LFU) file which has not been recently used. In one embodiment, the LFU file is discarded when the cache needs additional capacity to store files. In addition to the caching mechanism, system performance is enhanced through large reads which minimize the number of seeks and significantly reduce the overhead in another embodiment. It should be appreciated that associated with every read, especially reads through a file system to the disk drive and back out, are associated with a significant amount of overhead and seek time. By performing large reads, the system optimizes the overhead and seek times since they are not linearly related to the size of the file being read. Then, by caching the large reads and assigning a frequency factor the files will stay in cache, further improving the system performance. In one embodiment, the size of the reads is modifiable.

Figure 1:
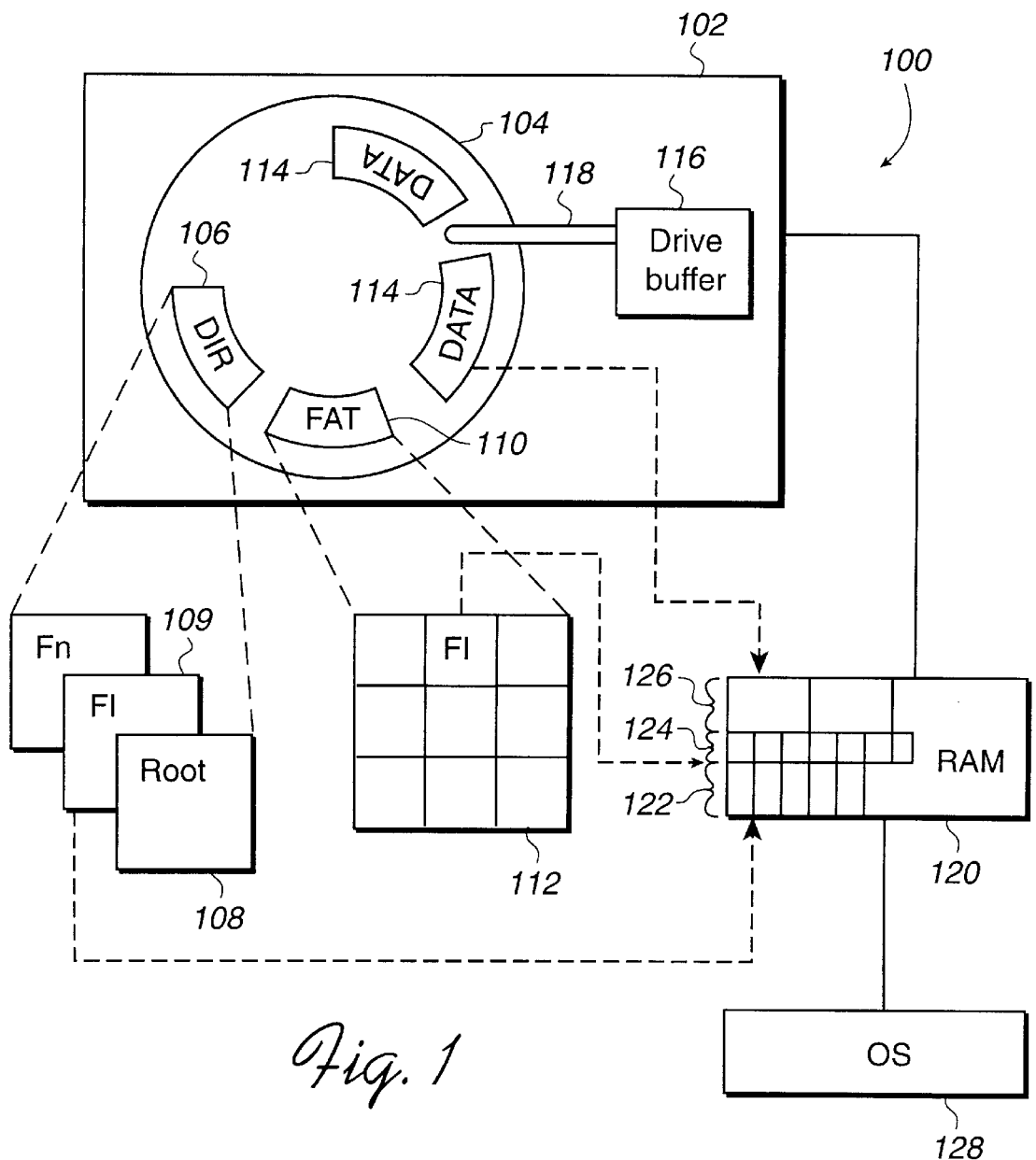
FIG. 1 illustrates a block diagram depicting an apparatus for providing a hybrid data caching mechanism in accordance with one embodiment of the invention.

FIG. 1 illustrates block diagram 100 depicting an apparatus for providing a hybrid data caching mechanism in accordance with one embodiment of the invention. Disk drive mechanism 102 includes disk 104. Contained on disk 104 are a directory structure 106, a file allocation table (FAT) 110 and data files 114. Directory structure 106 is further defined as including root directory 108 for the files on disk 104. In one embodiment, root directory 108 of directory structure 106 includes subdirectory 109 for file F1. For example, if file F1 is the file the user wants to open, then the root directory 108 will direct the operating system 128 to subdirectory 109 for file F1. In one embodiment, the system will read a 128 Kbyte section of the subdirectory and copy the 128 Kbyte section to the cache 120. As illustrated in FIG. 1, the cache 120 includes a section 122 where the directory information for file F1 is cached. It should be appreciated that the entry in the subdirectory 109 for file F1 will provide what cluster number in the file allocation table (FAT) 110 to start with to obtain the information which indicates where file F1 is located on the disk.

Continuing with FIG. 1, the operating system 128 seeks to the FAT 110 where it obtains the beginning cluster entry of file F1 on disk 104. In one embodiment of the invention, the OS 128 will read 128 Kbytes of the FAT 112 beginning with the cluster number obtained from the subdirectory 109. The 128 Kbyte read from the FAT 112 is copied to the RAM and cached in section 124 of the cache 120. With the beginning cluster number of file F1 obtained from the FAT 112, the operating system 128 will seek to the disk 104 to read the data 114 corresponding to file F1. In one embodiment of the invention, the OS 128 will read 128 Kbyte of the data 114 from the disk 104 beginning with the cluster number obtained from the FAT 112. The 128 Kbyte read of the data 114 is copied to the RAM and cached in section 126 of the cache 120. In another embodiment of the invention, the OS 128 is in communication with the RAM 120 as if it was the disk 104 because the caching is layered below the OS's disk driver and above the physical disk's bus driver. For example, if the OS 128 requests data from the RAM and the data is not in the RAM the data will be obtained from the disk 104 as described above. Similarly, if only a portion of the requested data is in memory, then the next 128 Kbytes of data will be read from the disk 104 through drive buffer 116 and movement of a read head attached to arm 116 and then transferred to the RAM in one embodiment of the invention.

It should be appreciated that while the reads from the subdirectory 109, FAT 112 and data 114 are provided above as 128 Kbyte reads, the reads could be 64 Kbyte reads or larger in another embodiment. The large reads (greater than 64 Kbyte) eliminate the overhead, i.e., seek times, rotational latencies, transfer times, etc., associated with performing two, four or more reads at 32 Kbytes or less as performed in the prior art. In addition, the operating system typically asks for additional sectors which are logically contiguous with the data just read. It should be appreciated that by performing the large reads, additional sectors the OS requests will already exist in memory. Here, if the OS wants the additional sectors moved to a different location in the memory, then a memory copy or memory swap can be performed to move the data from a first location to a second location in RAM. It should be appreciated that the memory swap within RAM is much faster than going out to the disk drive for the additional sectors.

Figure 2A:
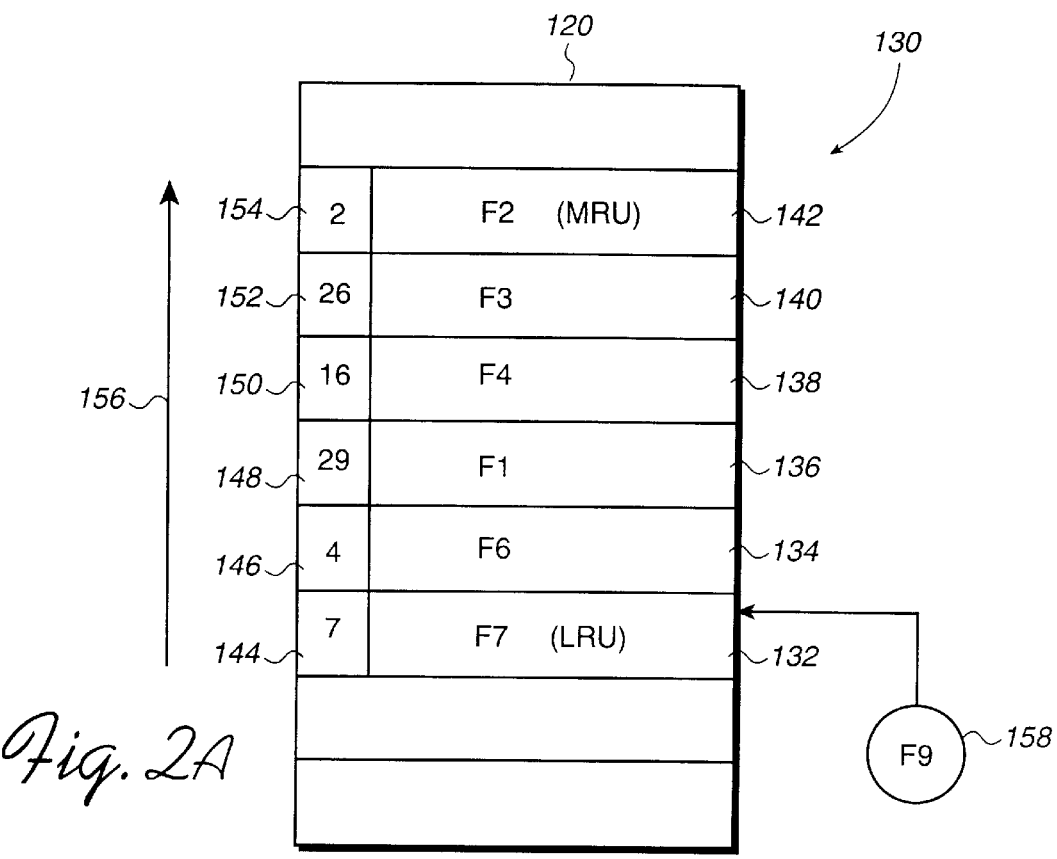
FIG. 2A illustrates a block diagram depicting a structure of a cache in RAM in accordance with one embodiment of the invention.

FIG. 2A illustrates block diagram 130 depicting a structure of a cache 120 in accordance with one embodiment of the invention. Block diagram 130 displays files F1 136, F2 142, F3 140, F4 138, F6 134 and F7 132. File F7 132 is illustrated as the least recently used (LRU) file. In other words, of the files in the cache, file F7 132 has gone the longest time as compared to the other files in the cache without being used by the operating system. It should be understood that the term "file" as used herein refers to a number of blocks of data i.e., any group of blocks of data. File F2 142 is the most recently used (MRU) file. Correspondingly, file F2 142 has gone the shortest time without being used by the operating system. In addition, a frequency factor is assigned to each of the files in the cache. The frequency factor is increased with each use of the file so that the frequency factor indicates how often a file is accessed in one embodiment. In another embodiment, the frequency factor is decreased with the lack of use of the corresponding file. File F7 132 has a frequency factor of seven 144, file F6 has a frequency factor of four 146, file F2 142 has a frequency factor of two 154, file F1 136 has a frequency factor of twenty nine 148 and file F4 138 has a frequency factor of sixteen 150, and so on. In one embodiment of the invention, once the target capacity of the cache is reached, the frequency factors are scanned beginning with the frequency factor for the LRU file in the cache and ending with the MRU file in the cache. In another embodiment, the frequency factors are periodically scanned.

With respect to FIG. 2A, the scanning begins with frequency factor 144 and ends with frequency factor 154 as these frequency factors correspond to the LRU and the MRU files, respectively. Arrow 156 designates the scanning direction from the LRU file to the MRU file. In one embodiment, the scanning of the frequency factors determines which file from the LRU file to the MRU file is the least frequently used (LFU) file which has been least recently used. It should be appreciated that the least frequently used file takes into consideration how often a file has been used through the frequency factor.

Furthermore, since the scanning is performed between the LRU and the MRU files, how recently a file has been used is also taken into consideration when determining which file to discard when freeing capacity in the cache. For example, if a frequently used file has not been recently used because a user is performing a lot of data reads, the frequency factor will guarantee that the frequently used file stays in the cache. Therefore, once the user has completed the data reads and the user needs to load something out of the directory for the next program, the data will still be in the cache. Accordingly, the large reads which capture the data initially combined with the frequency factor, which maintains frequently used data in the cache even though the data has not been recently used, allows for directory and FAT data to stay in the cache, thereby enhancing system performance. In one embodiment of the invention, the frequency factor for the MRU file is not considered when determining the LFU file since the MRU file has been so recently placed in the cache and has not had an opportunity to be reused.

Continuing with FIG. 2A, once a target capacity of the cache is reached the frequency factors are scanned as described above. The scan of the embodiment displayed in FIG. 2A will find file F6 134 as the LRU file with the lowest frequency factor i.e., the least frequently used (LFU) file which has been least recently used. As mentioned above, the MRU file acts as a stop for the scanning process, however, the MRU file is not chosen as the LFU file in order to prevent a thrashing situation in one embodiment. With the identification of the LFU file which has been least recently used, a new file which is to be placed in the cache, such as F9 158, replaces file F6 134.

The caching mechanism described above is self tuning in one embodiment. For example, should a user finish watching a movie on the system and proceed to perform word processing operations, the cache will have files from the movie which were frequently used. Because of the frequent use, these files will have a high frequency factor associated with them even though the files will not be used upon completion of the movie viewing. In one embodiment, the caching mechanism will decrement the frequency factor associated with these files to bring down the frequency factor so that the files are removed from the cache. For example, over an arbitrary real-time period the caching mechanism will decrement the frequency factors associated with the files logically close to the LRU file, including the LRU file by a factor of one or greater. Other features which may enhance the tuning include how often to decrement the factors, how far back to search towards the LRU file, how far forward to search from the LRU file, how much to decrement the factors by, scheduling the decrementing during periods of low disk activity, weighting certain files with frequency factors on their initial read into the cache to guarantee they remain above others, changing the size of the reads, and changing the amount of RAM that the cache can use, etc. In one embodiment, the user is provided an application to customize the tuning to their particular situation. In another embodiment, heuristics are built into a driver for self-tuning the caching mechanism.

The self tuning aspects of the caching mechanism also include embodiments to where adjustments are made when an MRU file is identified as the least frequently used file or if the least frequently and least recently used file is in a defined proximity to the MRU file. For example, if the MRU file is identified as the least frequently used file then the frequency factors associated with the files are decremented. This process is repeated until a least frequently and least recently used file other than the MRU file is identified. In another embodiment, rather than decrementing all the frequency factors associated with the files in the cache unit, only the frequency factors associated with the files proximate to the LRU file are decremented. For example, the frequency factors associated with the files in the bottom ⅓ i.e., the ⅓ of the cache unit logically proximate to the LRU file, of the cache unit may be decremented. It should be appreciated that any portion of the cache may be specified as to where to decrement the frequency factors associated with the files and that ⅓ was chosen for illustration purposes only and not meant to be limiting.

Continuing with the self tuning embodiments, an additional implementation of the above described embodiment is applicable where the MRU file is not identified as the least frequently and least recently used file. For example, if the least frequently and least recently used file is in the top ⅓ i.e., the ⅓ of the cache unit logically proximate to the MRU file, then it is specified not to choose the least frequently and least recently used file in the top ⅓ of the cache unit and to decrement frequency factors associated with the the files in the bottom ⅓ of the cache unit. This is repeated until a least frequently and least recently used file in the bottom ⅓ of the cache unit is identified in one embodiment. Here again, any portion of the cache unit may be chosen and ⅓ was chosen for illustration purposes only. It should be appreciated that the self tuning features can be optimized by a user through a graphical user interface in one embodiment.

Figure 2B:
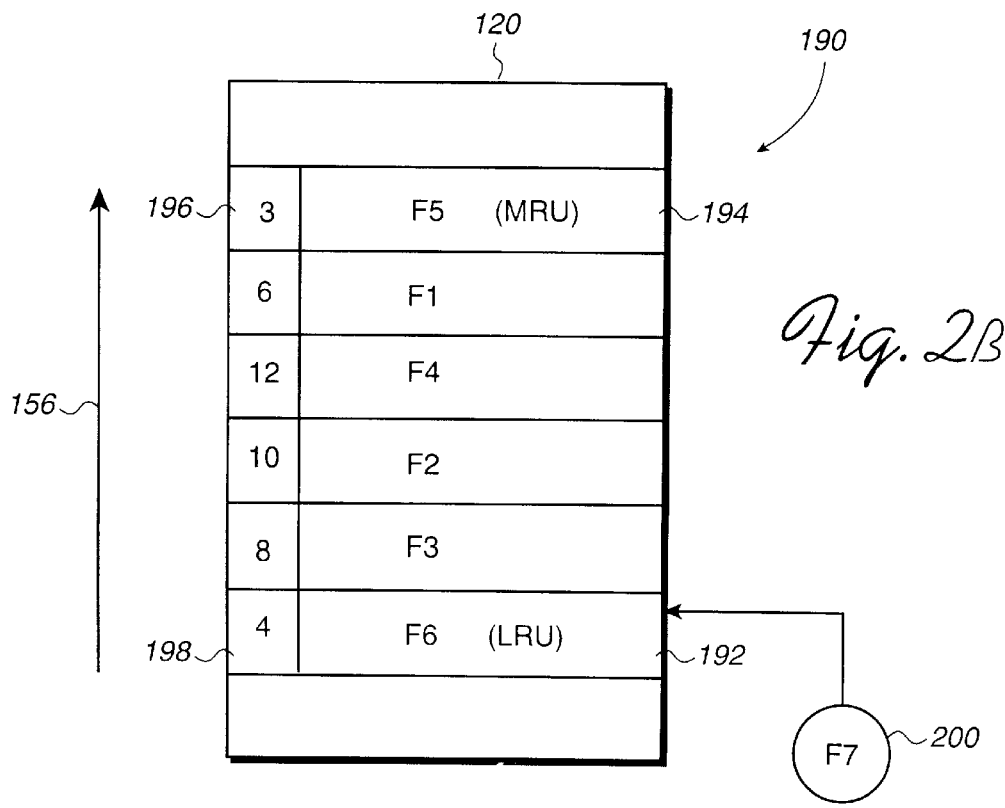
FIG. 2B illustrates a block diagram depicting a structure of a cache in RAM in accordance with another embodiment of the invention.

FIG. 2B illustrates block diagram 190 depicting a structure of a cache 120 in accordance with another embodiment of the invention. Block diagram 190 provides an additional snapshot of the caching mechanism for illustrative purposes. File F6 192 is the LRU file while file F5 194 is the MRU file with a frequency factor of three 196. The frequency factors for each of the files are scanned from the LRU file to the MRU file as depicted by arrow 156. In this embodiment, while file F5 has the lowest frequency factor it is not eliminated since it is the MRU file. It should be appreciated that a thrashing situation i.e., where the MRU file would always be discarded because of having the lowest frequency, would be avoided by not considering the MRU file. The next lowest frequency factor is frequency factor 198 which is associated with file F6 192 which also happens to be the LRU file. Accordingly, if the cache 120 has reached a target capacity file F6 192 will be discarded so that capacity of the cache 120 is freed-up in order for another file F7 200 to be placed in the cache. It should be appreciated that in one embodiment, as a new file is placed into the cache 120 a new frequency factor is associated with the file.

Figure 2C:
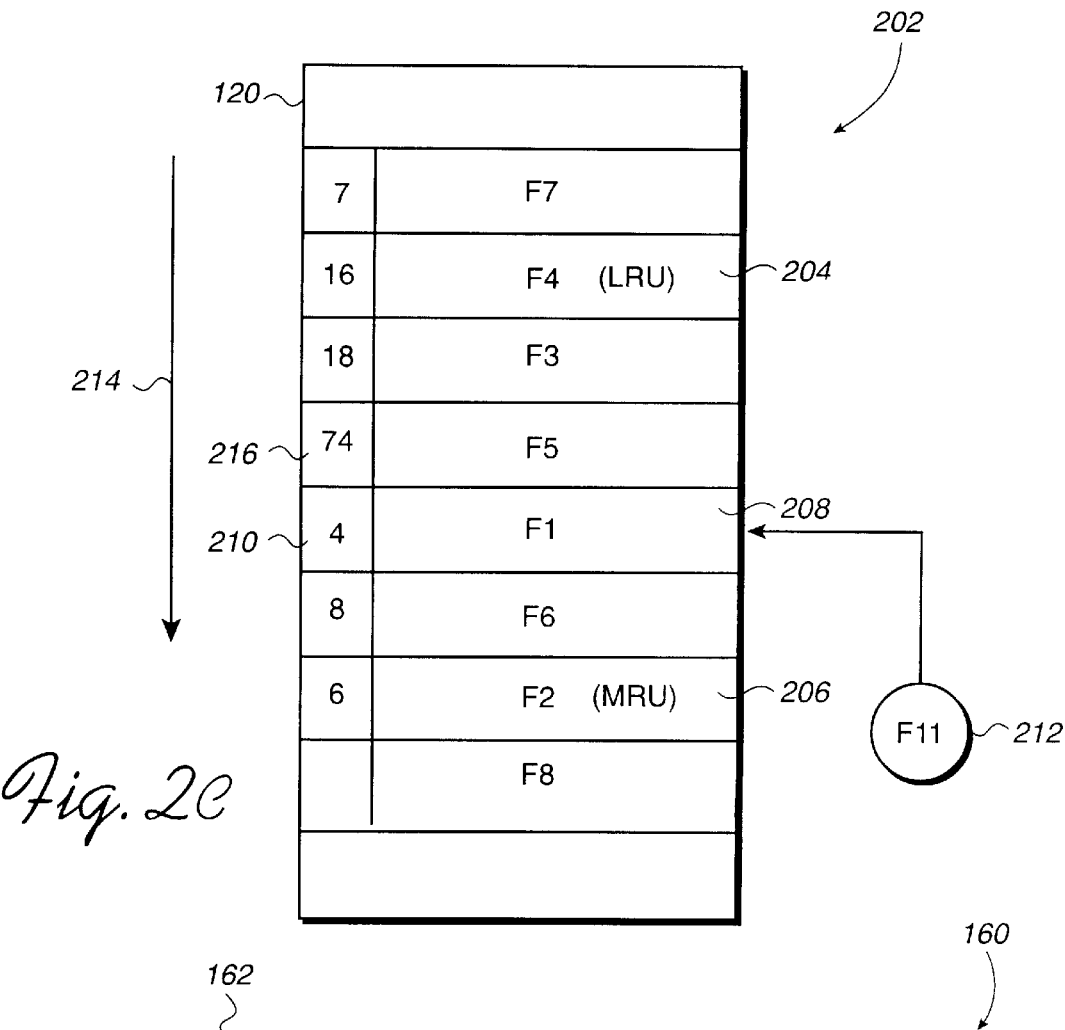
FIG. 2C illustrates a block diagram depicting a structure of a cache in RAM in accordance with yet another embodiment of the invention.

FIG. 2C illustrates block diagram 202 depicting a structure of a cache in RAM 120 in accordance with yet another embodiment of the invention. Block diagram 202 displays file F4 204, the LRU file and file F2 206 the MRU file. Similar to FIGS. 2A and 2B, the frequency factors are scanned from the LRU file to the MRU file as depicted by arrow 214. Here file F1 208 has the lowest frequency factor of four 210, therefore, file F1 208 is the least frequently and least recently used file. As such, when the target capacity of the cache is reached and file F1 is identified as the least frequently and least recently used file, file F1 is eliminated and another file F11 212 is placed in the cache 120. Continuing with block diagram 202, file F5 is associated with a frequency factor of 74 216. If for example, a user was previously using an application which demanded frequent use of file F5 and has stopped using that particular application, then the self tuning features described above are implemented in one embodiment. After a defined time period, the lack of use of file F5 will cause the frequency factor to be decreased. In another embodiment the magnitude of the decrements is one or greater.

Figure 3:
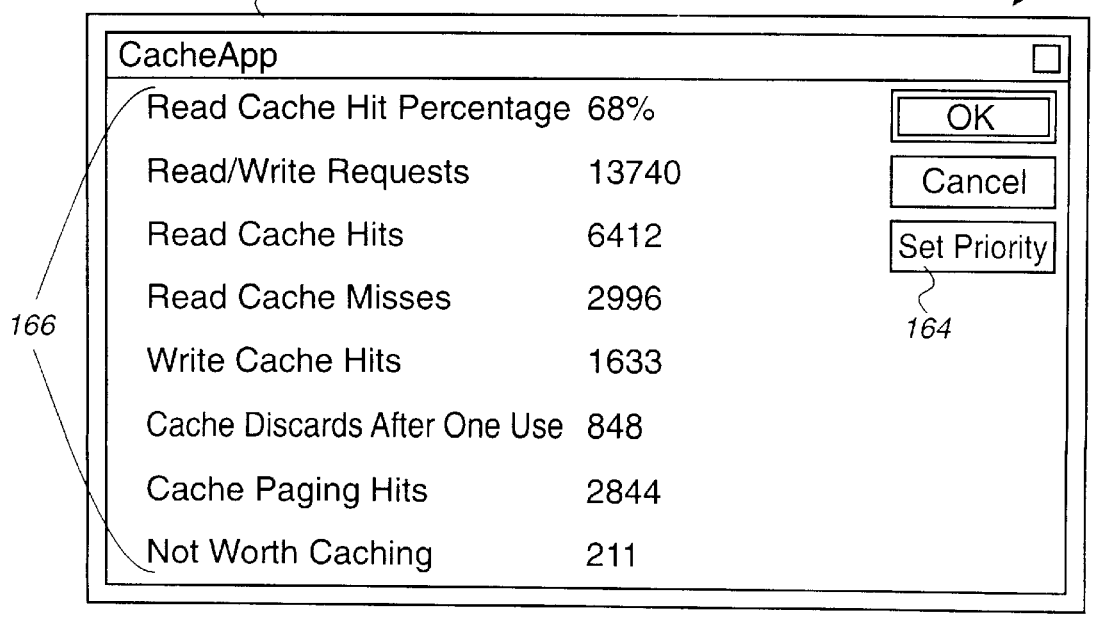
FIG. 3 illustrates a dialogue box which provides an interface for a user to tune the caching mechanism in accordance with one embodiment of the invention.

FIG. 3 illustrates a dialogue box 162 which provides an interface 160 for a user to tune the caching mechanism. Dialogue box 162 includes a number of statistics 166 which are presented to a user. For example, the read cache hit percentage represents the number of read cache hits divided by the total number of reads. One test of the hybrid caching mechanism described herein, yielded the results as displayed in dialogue box 162 where 68% of the reads were filled from the cache in the RAM, resulting in a 30% increase in overall system performance. As captured by these test results, it becomes apparent that the disk read rate is very important in affecting overall system performance.

The statistics 166 of dialogue box 162 are further defined below. It should be appreciated that the statistics 166 provided in FIG. 3 are for illustrative purposes only and are not meant to be limiting as the dialogue box 162 may or may not include the statistics 166. "Read/write requests" represent the total number of IO (input/output) requests made by the operating system. The "read cache hits" displays the number of read requests made by the operating system which were filled from the cache without doing any input/output (IO) to the disk. "Read cache misses" represents the number of read requests made by the operating system which required sending an IO to the disk to complete the request. "Write cache hits" displays the number of write requests made by the operating system (OS) where the data was copied to the cache in addition to an IO being sent to the disk to complete the request. "Cache discards after one use" is the number of cache units that were discarded without being used again. "Cache paging hits" represents the number of requests for paging IO that were in the cache. "Not worth caching" displays the number of read requests which were not cached due to the size of the read request. For example, if a read request were for a small amount of data that would only fill the very end of the 128 KByte cache unit, it would not be effective to spend the extra time reading all the data before that part of the 128 Kbyte cache unit.

Continuing with FIG. 3, set priority button 164 is included in dialogue box 162. In one embodiment, the set priority button 164 would optimize the frequency factors for reading directory and FAT data. Here, the reads would be weighted heavier, i.e., the frequency factor would be incremented by a factor of more than one for each time the directory or FAT data is accessed. It should be appreciated that under this embodiment the heavier weighted data is kept in the cache longer under one embodiment.

As shown below, the disk read rate has a significant impact on overall performance. Likewise, executing large reads significantly reduces both overhead and seeks. Benchmarks were performed where two different disks were read using small reads (4 KB per read) vs. large reads (128 KB per read). The first test (Test 1) was performed doing sequential reads i.e., reads where the data is read from beginning to end without ensuing seeks. The second test (Test 2) was done using random seeks between reads. The following tables illustrate the results.

|  | 4 KB Reads | 128 KB Reads | % Improvement |
|---|---|---|---|
| Test 1 - Sequential Reads | | | |
| Disk Brand A | 13,500 KB/s | 18,200 KB/s | 35% |
| Disk Brand B | 10,400 KB/s | 27,200 KB/s | 162% |
| Test 2 - Random Read | | | |
| Disk Brand A | 230 KB/s | 4900 KB/s | 2130% |
| Disk Brand B | 180 KB/s | 4600 KB/s | 2556% s |

As illustrated above, performing the large reads results in significant improvement in system performance by reducing the overhead.

An example for understanding how large reads reduce seeks is differentiated below from the prior art. It should be appreciated that the example is provided for illustrative purposes only and is not meant to be limiting. First a typical application not employing the hybrid caching mechanism is discussed. Program A reads and opens a file and begins reading the file with a 32 KB read or less. Opening the file causes a directory to be accessed, corresponding to one seek and three reads to read the directory's data until the file is found. Then, one seek and one read are executed to obtain the FAT information for the file. Next, one more seek and one read are performed for the first 32 KB, or less, of the actual file. While Program A processes the first 32 KB (or less), Program B reads some data somewhere else on the disk. When Program A reads its next 32KB's, or less of data, the disk must seek back to the file to perform the read resulting in one more seek and one more read.

With the proposed caching mechanism installed, when the first block of the directory was read (one block being approximately 512 bytes), up to an additional 127.5 KB would be read with it. When the additional directory reads were needed, the data would already be in memory, thus no additional reads would be necessary, resulting in only one seek and one read. Since the FAT is accessed when the directory is first accessed, a large read is performed (128 KB) of the data in the FAT beginning with the first cluster pointed to from the directory as described above. More than likely, most if not all of the FAT would be in memory after the large read since FAT's are typically less than 256 KB in size. Thus, no additional seek and no additional read is necessary once the data is in the cache.

When it is time to read the actual data, a seek and a read (i.e., large read greater than or equal to 64 KB) would take place. Because the previous large read already has the next 32 KB in memory, no additional seek and no additional read is necessary as required in the example above. Thus, the caching mechanism, in this example, would save two seeks and three or more reads, thereby significantly improving performance.

The other two aspects employed by this caching mechanism, frequency of use and MRU-LRU, combine with the extended reads to provide superior caching. By using the frequency factor in combination with MRU-LRU caching, data that gets used heavily, with intervening periods of non-use, is not discarded. An additional factor that affects cache performance, and one in which frequency of use helps to improve, is that when large files are read, they tend to fill all of the cache, forcing out needed, but less recently used data. Most often, file data is read sequentially, then discarded. Since a frequency of use count is kept for each piece of cached data, the caching mechanism maintains the truly important data, even when very large files are read.

Finally, because of how the frequency of use and MRU-LRU information is used by the caching mechanism, a very good balance is automatically maintained. While some programs reuse file data and others just read and discard, the frequency of use factor tends to keep the reused data, even if the reused data has not been recently used. By selecting the less frequently and less recently used data at the LRU end of the list to be discarded, the hybrid caching mechanism protects frequently used files from being discarded prematurely. In one embodiment, as discards occur over time, the frequency count is decremented for cached data at the LRU end of the list. Therefore, the cached data eventually becomes available to be discarded as well. It should be appreciated that the caching mechanism is self-balancing regarding which data should be kept in one embodiment.

Figure 4:
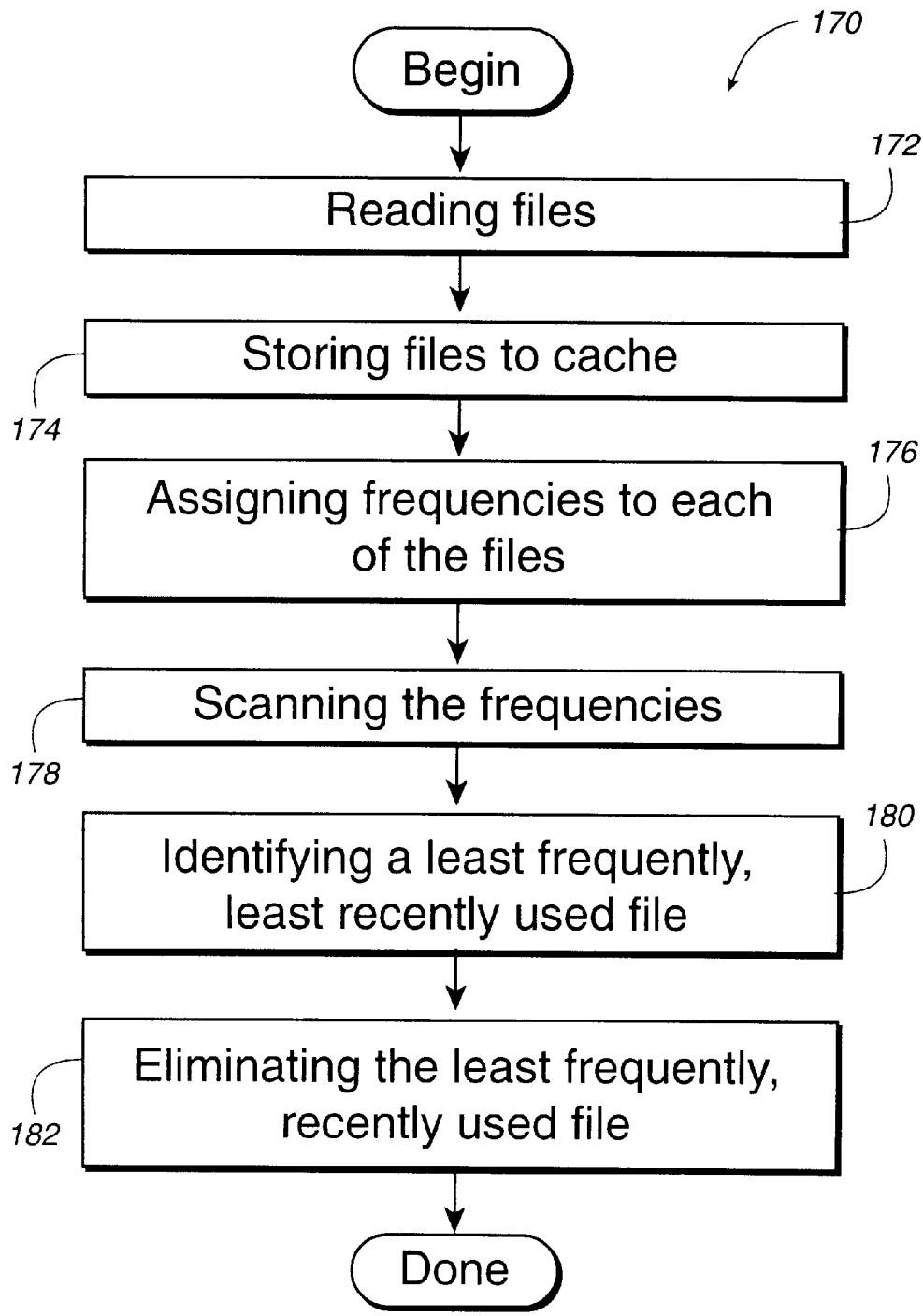
FIG. 4 illustrates flowchart displaying a method of caching data by a hybrid caching mechanism in accordance with one embodiment of the invention.

FIG. 4 illustrates flowchart 170 displaying a method of caching data by a hybrid caching mechanism in accordance with one embodiment of the invention. Flowchart 170 initiates with operation 172 where the files are read. In one embodiment, the files are read from a storage medium in response to a request by the operating system. It should be appreciated that the files i.e., any group of blocks of data, include the directory files, the FAT files and the actual data files. In another embodiment, large reads i.e., reads of extended segments, are performed as described above with reference to FIGS. 1 and 2A–C, thereby reducing the overhead by minimizing the seeks and reads to the hard drive. Next, the method advances to operation 174 where copies of the files read in operation 172 are stored in a cache. In one embodiment, the cache is an area of the random access memory. Then, the method proceeds to operation 176 where frequency factors are assigned to each of the files in the cache. Here, the frequency factors indicate how often each of the corresponding files are requested by the operating system. In one embodiment, each file in the cache is associated with a frequency factor. As described in reference to FIGS. 2A–C, the frequency factors are incremented with each use of the corresponding file in another embodiment. It should be appreciated that here a file refers to any group of blocks of data.

The method of block diagram 170 then advances to operation 178 where frequency factors are scanned. In one embodiment, the frequency factors are scanned in response to a target capacity of the cache being reached as described in reference to FIGS. 2A–C. For example, as the operating system requests various files from a hard drive, the files (including the directory and FAT files) are cached. Eventually a target capacity of the cache is reached, thereby requiring capacity to be liberated prior to storing more files in the cache. It should be appreciated that the target capacity can be any percentage of the maximum capacity of the RAM in one embodiment. In another embodiment of the invention, the frequency factors are scanned from the least recently used file to the most recently used file as depicted in FIGS.

2A–C. The method then proceeds to operation 180 where the least frequently and least recently used file is identified. In one embodiment, the least frequently and least recently used file is the file with the lowest frequency factor between the LRU file and the MRU file, not including the MRU file. It should be appreciated that when the scanning occurs from the LRU file to the MRU file the file with the lowest frequency factor will represent the file that is both the least recently used, since it is logically located between the LRU and MRU files and the least frequently used file, since it has the lowest frequency factor. The method terminates with operation 182 where the least frequently and least recently used file is eliminated from the cache to free capacity for another file.

Figure 5:
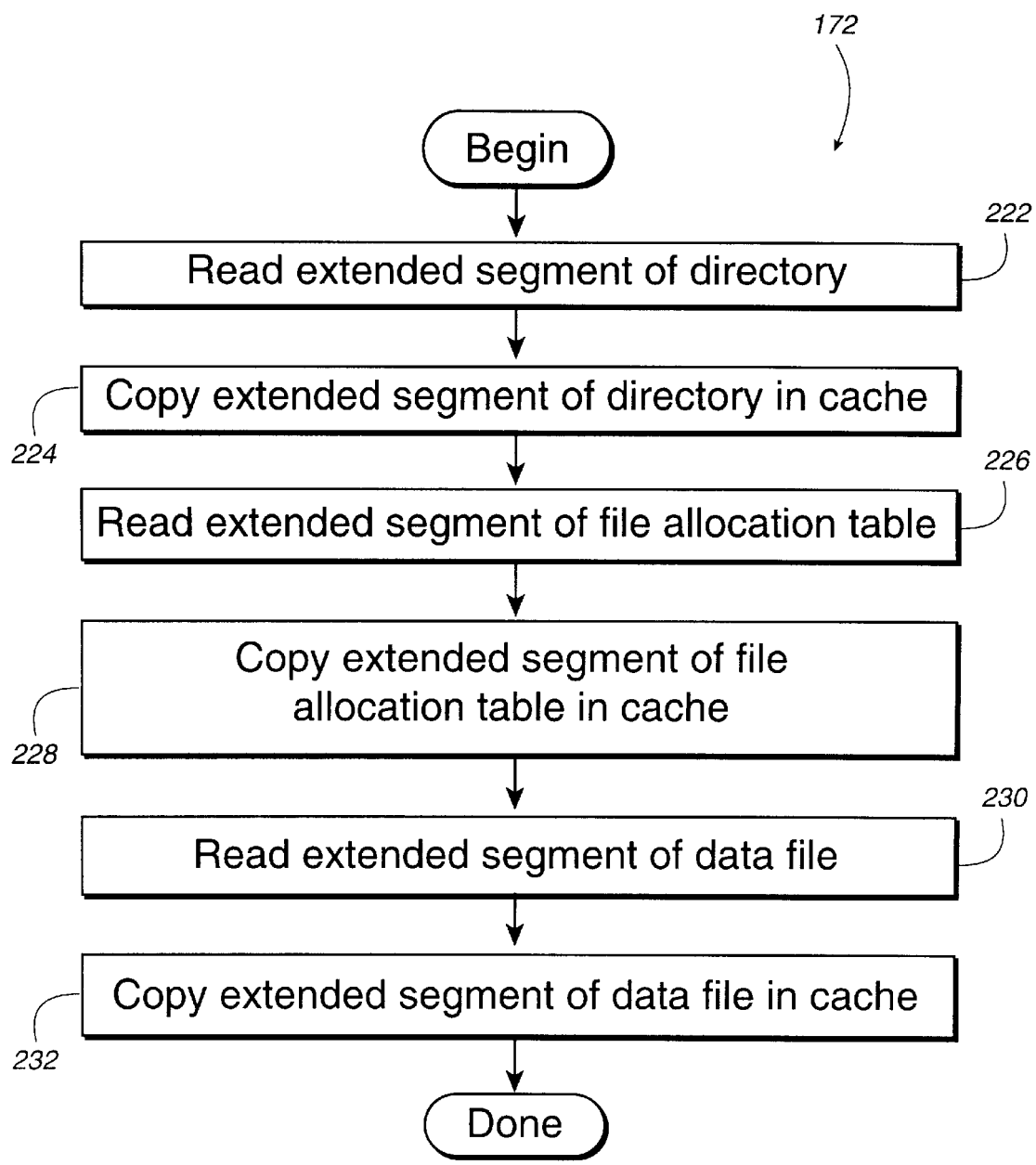
FIG. 5 illustrates a flowchart representing a more detailed description of an operation for reading files in extended segments in accordance with one embodiment of the invention.

FIG. 5 illustrates flowchart 172 representing a more detailed description of operation 172 of FIG. 4 where the files are read in accordance with one embodiment of the invention. Flowchart 172 initiates with operation 222 where an extended segment of the directory is read. As discussed in reference to FIG. 1, a file is requested by the operating system in one embodiment. Accordingly, a seek to the storage medium causes the directory to be accessed. The directory is then read until the desired file is found. In one embodiment, when the first block of the file is read an additional 64, 128 or 256 Kbytes of data are read with it. Next, in operation 174 copies of the large reads i.e., 64, 128 or 256 Kbytes, of operation 172 are stored in the cache. As discussed above, the directory will point to a cluster number of the FAT to obtain the information of where a desired file is located on the storage medium. The method then advances to operation 226 where an extended segment of the FAT is read. Similar to operation 222, when the first cluster is read an additional 64, 128 or 256 Kbytes comprising a chain of clusters are read with the first cluster. In operation 228 a copy of the read data from the FAT of operation 226 is placed into the cache. The FAT provides the beginning cluster number of the data file on the storage medium. Next, in operation 230, an extended segment of the data file is read. Here, when the first cluster is read, an additional 64, 128 or 256 Kbytes approximately, of data are included in the read in one embodiment. Then, in operation 232 a copy of the extended read segment of the data file is placed in the cache. In one embodiment, frequency factors are assigned to each of the files placed in the cache in operations 224, 228 and 232.

It should be appreciated that the reads of the extended segments allows for the minimization of seeks and reads from the storage medium, since the files are transferred to the cache upon the initial read. Furthermore, in one embodiment the size of the reads are modifiable allowing a user to adjust the read size for optimum performance. The extended reads, in conjunction with the hybrid caching mechanism described above, significantly reduce overhead so that system performance is enhanced. Depending upon the application in use the extended read may be a read of 32 Kbytes or larger in one embodiment.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for caching data in a computer, the method comprising:

reading extended segments of data;

storing files in a cache, the files being associated with the extended segments of data, the cache being located in a random access memory (RAM) of the computer;

associating a frequency factor to each of the files in the cache, the frequency factor of each of the files reflecting how frequent each of the files is accessed;

identifying a least frequently and least recently used file, the least frequently and least recently used file having the frequency factor be lower than the frequency factor for other of the files; and eliminating the least frequently and least recently used file from the cache when a target capacity of the cache is reached.

2. The method as recited in claim 1, wherein the extended segments are one of 64 Kbytes, 128 Kbytes and 256 Kbytes in size.

3. The method as recited in claim 1, further including:

providing a driver for decrementing a frequency factor after a time period of non-use of a corresponding file.

4. A caching method for enhancing system performance of a computer, comprising:

reading an extended segment of data in response to a request from an operating system;

storing copies of files associated with the extended segment in a cache;

assigning frequency factors to each of the files stored in the cache, the frequency factors indicating how often each of the corresponding files are requested by the operating system;

scanning the frequency factors, the scanning being performed in response to a target capacity of the cache being attained;

identifying a least frequently and least recently used file; and eliminating the least frequently and least recently used file to liberate capacity of the cache.

5. The method as recited in claim 4, wherein the files are read from a storage medium containing one of a directory, a file allocation table and a data file.

6. The method as recited in claim 4, wherein the scanning the frequency factors further includes:

scanning from a frequency factor corresponding to a LRU file to a frequency factor corresponding to a MRU file.

7. The method as recited in claim 4, wherein the caching method is self tuning.

8. A method for caching files in a cache of a random access memory (RAM) of a computer, comprising:

requesting files, the files being stored on a storage medium;

reading the files;

copying the files to the cache;

assigning a frequency factor to each of the copied files, the frequency factor reflecting how often each of the copied files is accessed;

in response to reaching a target capacity in the cache, the method further includes, scanning the frequency factor for each of the files, the scanning being configured to identify a least frequently used file that has been least recently used without considering a frequency factor corresponding to a most recently used file; and discarding the least frequently used file to free up capacity in the cache.

9. The method as recited in claim 8, wherein the storage medium is a hard drive.

10. The method as recited in claim 8, further including:

enabling adjustment of a weighting factor associated with data read from one of a directory and a file allocation table.

11. The method as recited in claim 8, wherein the method operation of reading the files includes, reading extended files.

12. A computer readable media having program instructions for a caching method which enhances the system performance of a computer, comprising:

program instructions for reading an extended segment of data in response to a request from an operating system;

program instructions for storing files in a cache, the files being associated with the request from an operating system, the cache being located in a random access memory of the computer;

program instructions for assigning frequency factors to each of the files stored in the cache, the frequency factors indicating how often each of the corresponding files are requested by the operating system;

program instructions for scanning the frequency factors, the scanning being performed in response to a target capacity of the cache being attained;

program instructions for identifying a least frequently and least recently used file; and program instructions for eliminating the least frequently and least recently used file to liberate capacity of the cache.

13. The computer readable media as recited in claim 12 further comprising:

program instructions for the caching method are self-tuning.

14. The computer readable media as recited in claim 12 further comprising:

program instructions for allowing a user to adjust a size of the extended segment that is read.

15. An apparatus for caching files in a computer system, the computer system including a microprocessor, a random access memory (RAM) and an operating system, the apparatus comprising:

a disk drive, the disk drive storing data, the data including a directory structure, a file allocation table (FAT) and file data; and a cache, the cache being located in the random access memory (RAM), the RAM being configured to cache files requested by the operating system according to a caching mechanism, the caching mechanism assigning frequency factors to each of the files in the cache, wherein upon a target capacity of the RAM being attained, the frequency factors are scanned from a frequency factor for a LRU file to a frequency factor for a MRU file, not including the frequency factor for the MRU file.

16. The apparatus as recited in claim 15, wherein the caching mechanism is self tuning.

17. The apparatus as recited in claim 15, wherein the least frequently and least recently used file is discarded to free cache capacity.

* * * * *